United States Patent [19]

Marshall et al.

[11] 4,373,186
[45] Feb. 8, 1983

[54] MATRIX METHOD AND APPARATUS FOR ENGINE ANALYSIS

[75] Inventors: John P. Marshall, Plainwell; Dennis A. Ruffer, Kalamazoo, both of Mich.

[73] Assignee: Allen Group Inc., Kalamazoo, Mich.

[21] Appl. No.: 177,846

[22] Filed: Aug. 14, 1980

[51] Int. Cl.³ .................... G06F 15/50; G01M 15/00
[52] U.S. Cl. ................................ 364/551; 73/117.3; 364/431.01
[58] Field of Search ............... 364/424, 551, 431.01; 73/116, 117.2, 117.3

[56] References Cited

U.S. PATENT DOCUMENTS

| | | | |
|---|---|---|---|
| 3,439,534 | 4/1969 | Pilgrim | 73/117 |
| 3,485,093 | 12/1969 | Muller et al. | 73/116 |
| 3,630,076 | 12/1971 | Staudt | 73/117.3 |
| 4,125,894 | 11/1978 | Cashel et al. | 364/442 |
| 4,128,005 | 12/1978 | Arnston et al. | 73/117.3 |
| 4,234,921 | 11/1980 | Kinoshita et al. | 364/551 X |
| 4,267,569 | 5/1981 | Baumann et al. | 73/116 X |
| 4,301,678 | 11/1981 | Full et al. | 73/116 |

OTHER PUBLICATIONS

Allen Test Programmed Training Course Manuals 16-000 Series [Part No. 25601] and 25-000 Series [Part No. 25620] Engine Analyzers [Two Manuals].
Operation Guide, 25-000 Series Engine Analyzers.
Allen Test Programmed Training Course Manual 23-000 Series Infrared Analyzer.

*Primary Examiner*—Felix D. Gruber
*Attorney, Agent, or Firm*—Kenyon and Kenyon

[57] ABSTRACT

A results based "AND" matrix method and means for the diagnostic analysis of an internal combustion engine is described. A diagnostic evaluation of the operating condition of an internal combustion engine is achieved, based solely on AND function relationships with respect to currently measured engine parameter values and a diagnostic equation, without the need for making, collecting and correlating a plurality of separate evaluative judgments regarding engine operating parameters.

8 Claims, 3 Drawing Figures

MATRIX METHOD AND APPARATUS FOR ENGINE ANALYSIS

FIELD OF THE APPLICATION

This invention relates to improved methods and apparatus for the analysis and diagnosis of operating conditions of a multicylinder internal combustion engine and in particular relates to programmed apparatus for such analysis and diagnosis which is used in conjunction with such methods.

BACKGROUND OF THE INVENTION

Servicing internal combustion engines used in automobiles, trucks, and other vehicles is an old art which has continuously advanced in complexity, requiring ever more sophisticated testing apparatus and analytical skills. As the design and operation of internal combustion engines has become more technologically sophisticated, the adjustment of variables has become increasingly more critical to achieve optimum engine performance. Furthermore, the requirements of environmental anti-pollution and energy conservation standards have demanded that the optimum performance of internal combustion engines be consistently and regularly achieved.

Accurate, reliable, and repeatable testing of internal combustion engines is thus necessary to determine whether optimum performance is achieved, and if not, to diagnose potential deficiencies in performance and to designate corrective measures.

Traditionally, a service mechanic has provided such evaluative, diagnostic and corrective analysis. The increasing sophistication of internal combustion engines and the multitude of diverse technological fields involved has made it more difficult, and increasingly more expensive, to train a technician having the requisite degree of skill to test, diagnose, and repair an internal combustion engine. And even a sufficiently skilled technician is confronted with differences in the types of engine configuration, ignition systems, and problems encountered.

Typically, a service technician will use so-called "diagnostic" apparatus which are known in the prior art for use in testing internal combustion engines and providing information on which a diagnosis of engine operating conditions can be based. Principally, these apparatus provide test information relating to the performance of engine systems and require the evaluation of data so that (1) performance deficiencies can be identified; (2) suitable adjustments made; and or (3) defective engine parts can be identified and replaced.

Examples of such testing apparatus include commercial equipment such as the 16-000 and 25-000 Series Engine Analyzers manufactured by Allen Group, Test Products Division, Kalamazoo, Mich. 49007. These engine analyzers provide means for taking thorough measurements under specified test conditions to allow the diagnosis of the various operating systems of an internal combustion engine. Means are included for running a battery of tests of pertinent engine operating parameters. Data collected for each test is recorded in a comprehensive "Diagnostic Report" so that a reliable guide of engine performance under different operating conditions is obtained. Beginning with hookup to the engine, the engine systems tested are: (1) starting, (2) charging, (3) primary, (4) timing, (5) secondary output, (6) performance, (7) carburetor and exhaust, and (8) carburetor adjustment. The collected data for each system test consists of manually recorded data derived from analog meter readings (e.g. volts, current, RPM, dwell, etc.) taken while the engine is operated under various conditions.

Computer operated testing apparatus has also been proposed, such as described by Aloysius T. Cashel, et al., in U.S. Pat. No. 4,125,894, issued Nov. 14, 1978 and entitled "Engine Test And Display Apparatus." This apparatus also allows a series of measurements of operating parameters of an internal combustion engine to be conducted. A readout of measured engine parameters is displayed in a digital format on the face of a CRT or on a "print out" instead of on a meter; comparative readings occurring under different operating circumstances may be simultaneously displayed. Even though such apparatus allows the programmed acquisition of engine performance data by digital means, the diagnosis of engine deficiencies and maladjustments yet remains the responsibility of the operating technician.

Upon the acquisition of predetermined test information, various diagnostic equations and instructional or diagnostic matrices have been employed as methods to aid the evaluation of measured engine parameters to identify defective engine components or to pinpoint problem areas. For example, diagnostic equations and matrices for use in connection with the aforementioned Allen Test Products 16-000 and 25-000 Series Engine Analyzers are set forth in *Allen Test Programmed Training Course*, a manual provided by the manufacturer which sets forth instructions for use of the test equipment and provides various analytical methods for consideration of the data which the test equipment generates. A typical example includes instructions in the *Training Course* manual with respect to "Starting Current" analysis which indicate that high current and low cranking voltage is usually caused by a defective starter. Another example is a diagnostic matrix showing the various combinations of evaluative "low", "good", "high" evaluations for cranking volts, engine speed, starter current and recovery voltage, which indicate designated "likely problem[s]".

An apparatus is described by Robert W. Arnston et al., in U.S. Pat. No. 4,128,005 issued Dec. 5, 1978 and entitled "Automated Engine Component Dignositic Techinques," (this patent also refers to the apparatus of the aforementioned 4,125,894 patent), in which engine performance data that is acquired is compared according to a computer program against engine specifications; a relative evaluation of that measured data is next obtained, (i.e. "high," "within," "low"), in the form of coded signals. These relative evaluations are collected and stored and then analyzed in matrix format by the computer program according to an AND/OR matrix equation to identify defective engine components or operating areas. Such an apparatus essentially adapts the conventional diagnostic "matrix" to a computer which conducts a similar analysis of stored evaluative data after all pertinent tests of the engine are accomplished.

A deficiency in certain computerized prior art methods and apparatus is that their diagnostic capability is principally limited to "comparator" type evaluations based upon stored specifications. This "comparator" type of operation requires a completed data set, much like a manually recorded "Diagnostic Report," before analysis is conducted, and involves an AND/OR matrix equation for diagnosis which is a format that intrinsically may not be able to provide a reliable solution, and which may be exceedingly complex in its programming requirements if computer operation is desired.

OBJECTS OF THE INVENTION

It is an object of this invention to provide an improved apparatus and an improved method for the computerized analysis of engine operating data which bypasses the separate "comparator" steps, used in other methods and apparatus, of (1) qualitatively determining the relationship of a measured signal with respect to a specification range, as hi, within, or low, then (2) collecting a number of these qualitative comparisons and then (3) conducting a diagnosis based on the pre-determined interrelationship of such various qualitative evaluations with respect to a predetermined equation or matrix which identifies a problem area or defective component. Thus, it is an object of the present invention to provide improvements in analytical methods of and in apparatus for engine diagnosis as compared with the prior art discussed above, and in other "comparator" types of apparatus, such as described in U.S. Pat. No. 3,439,534, "Automotive Testing Center" issued Apr. 22, 1969 in the name of O. P. Pilgrim et. al.; No. 3,483,093, "Engine Performance Analyzer," issued Dec. 23, 1969 in the name of D. M. Muller, et al. and No. 3,630,076, "Engine Analyzer," issued Dec. 28, 1973 in the name of James E. Staudt, et al.

In contrast, the object of the apparatus described herein is to provide a "results based" matrix for diagnostic analysis. In the apparatus, an instantaneous analysis of engine operating parameters measured in real time based solely on AND functions which correlate directly with actual measured engine parameter values is conducted with respect to a diagnostic matrix. The results based matrix identifies engine problems or defects based upon the absolute values of measured parameters with respect to matrix location, rather than upon evaluative matrix information based on prior qualitative comparisons as is done in prior art methods and apparatus. As a result, time required for diagnosis according to programmed operation is reduced; operating efficiency and repeatability are increased; use of a matrix equation based solely on AND functions provides a greater degree of certainty and reliability with a simpler set of programming requirements.

Preferably, the matrix of the invention is used in conjunction with and implemented by a microprocessor based engine analyzer which provides information acquisition, storage capacity and diagnostic ability in an engine analyzer. The apparatus provides efficient and less time consuming means in conjunction with microprocessor controlled apparatus to collect engine data based on an engine's real operating characteristics, sift this information automatically, and deduce in a logical manner which part in the engine's starting, charging, fuel distribution, compression, timing or ignition systems needs adjusting, overhauling or replacing. It is thus an object to provide a means for accomplishing testing, data collection and diagnosis with or without a skilled mechanic and to provide apparatus and methods for the efficient utilization of computer adapted diagnostic equipment.

Another object of the apparatus is to provide an operational mode in such apparatus that requires operator programming only with respect to the relatively minor inputs of number of cylinders, engine dwell and timing advance specifications, type of ignition, emission control devices (if any), and type of timing (magnetic sensing or timing light), and symptom selection. In providing a symptom selection, it is thus an object of the apparatus to select and emphasize engine operating data for analysis and programmed decision making that is most closely related to possibly defective or misadjusted components.

A further object is to provide such means and apparatus to test all four cycle gasoline engines, from three to sixteen cylinders; to display engine operating characteristics (analog, digital and waveform) on a CRT (cathode ray tube), as well as to print out engine characteristics and the diagnosis of faulty or mis-adjusted parts in "hard-copy" form.

Hence, the apparatus and method described provides efficient diagnosis of engines with a high degree of accuracy and repeatability upon a greatly expanded data base, and with a reduced number of analytical program steps. A majority of "traditional" tune-up parts failures and other tune-up problems may be identified, if not by component, by a system problem.

BRIEF DESCRIPTION OF THE DRAWINGS

With respect to the specification:

FIGS. 3a, 3b, 3c taken together as in FIG. 3 is a flow chart which shows a representative testing sequence of the "results" based AND matrix analysis according to the invention.

SUMMARY OF THE INVENTION

In the preferred embodiment, a diagnosis of an engine "system" is accomplished while measurements of engine operating parameters associated with the system during a predetermined mode of engine operation are made and directly compared to predetermined stored values. The result of each comparison is correlated with a predetermined position in a matrix. The matrix position of any particular comparison result corresponds with a predetermined stored value and a measured parameter. From a correlation of matrix locations, accomplished by AND functions, a defective component or problem area may be identified.

According to the method and apparatus of the invention, it is unnecessary that separate memory means be employed to store evaluative data (hi, low, within) obtained from a comparison of measured data with specifications; it is also unnecessary that a preliminary comparison with a parameter specification "range" be separately made. In the inventive apparatus, the comparison result is preferably a "yes" or "no" answer which can be represented by a data bit, and the position of a comparison result or "data bit" in the matrix is dependent on the relationship of actual measured values to predetermined values, rather than upon an evaluative (hi, low, within) comparator type conclusion with respect to a specification range which is subsequently input into a diagnostic matrix. The apparatus provides a direct diagnosis based on AND function binary alternatives or equations of test results rather than on test "conclusions;" hence, the diagnosis provided is independent of separate parameter specification range comparisons. Because the diagnostic matrix equation is based solely on AND functions, the number of possible matrix combinations required for a programmed diagnosis is reduced and the number of "software" programming steps necessary to provide a diagnostic conclusion is also reduced.

The apparatus provides reliability and certainty in diagnosis while increasing the accuracy of and the amount of data on which diagnosis is based.

The preferred embodiment is included in apparatus means which provides, a total diagnosis of all engine systems. As used herein, the term "engine system" refers to those fixed or variable engine components which are conventionally associated together with respect to the performance of an identifiable function associated with engine operation. Such systems generally include: electrical, ignition, carburation, and emission; performance is evaluated with respect to starting, charging, idling, and driving conditions of the engine. For each system, the need for an adjustment to, or the identification of a defective component is usually indicated in such apparatus in alphabetic characters on the screen of a CRT after appropriate measurements of engine operating parameters for the system are processed, compared with predetermined values, and an evaluation of matrix locations carried out according to a predetermined AND diagnostic equation. This procedure is dependent on parameter measurement results which are independent of separately operator specified individual system specifications.

In this regard the only "specifications" required to be input by the generator in the apparatus, with which the preferred embodiment is intended, are overall engine characteristics such as; number of cylinders, type of ignition, and timing advance and engine dwell specifications, emission control devices (if any) and type of timing (magnetic sensing or timing light). Optionally, a problem area or symptom may also be input as an operator selectable "specification." These specifications are used in the matrix to qualify decisions for each individual engine tested. Engine diagnosis is achieved according to the comparison of the parameters measured with respect to a matrix location for that parameter in accord with a predetermined AND matrix equation based on a predetermined AND relationship of matrix locations where values are determined from measured input data to identify defective systems, parts and adjustments.

The apparatus and method is employed with testing apparatus that allows a completely computerized operation of engine analysis and diagnostic equipment. In such an apparatus, a testing sequence begins with hook-up, and the entry of the operator selectable variables described above into a preprogrammed diagnostic microprocessor to qualify the matrix implemented by the microprocessor and its associated memory.

DESCRIPTION OF THE PREFERRED EMBODIMENT

Figure 1:
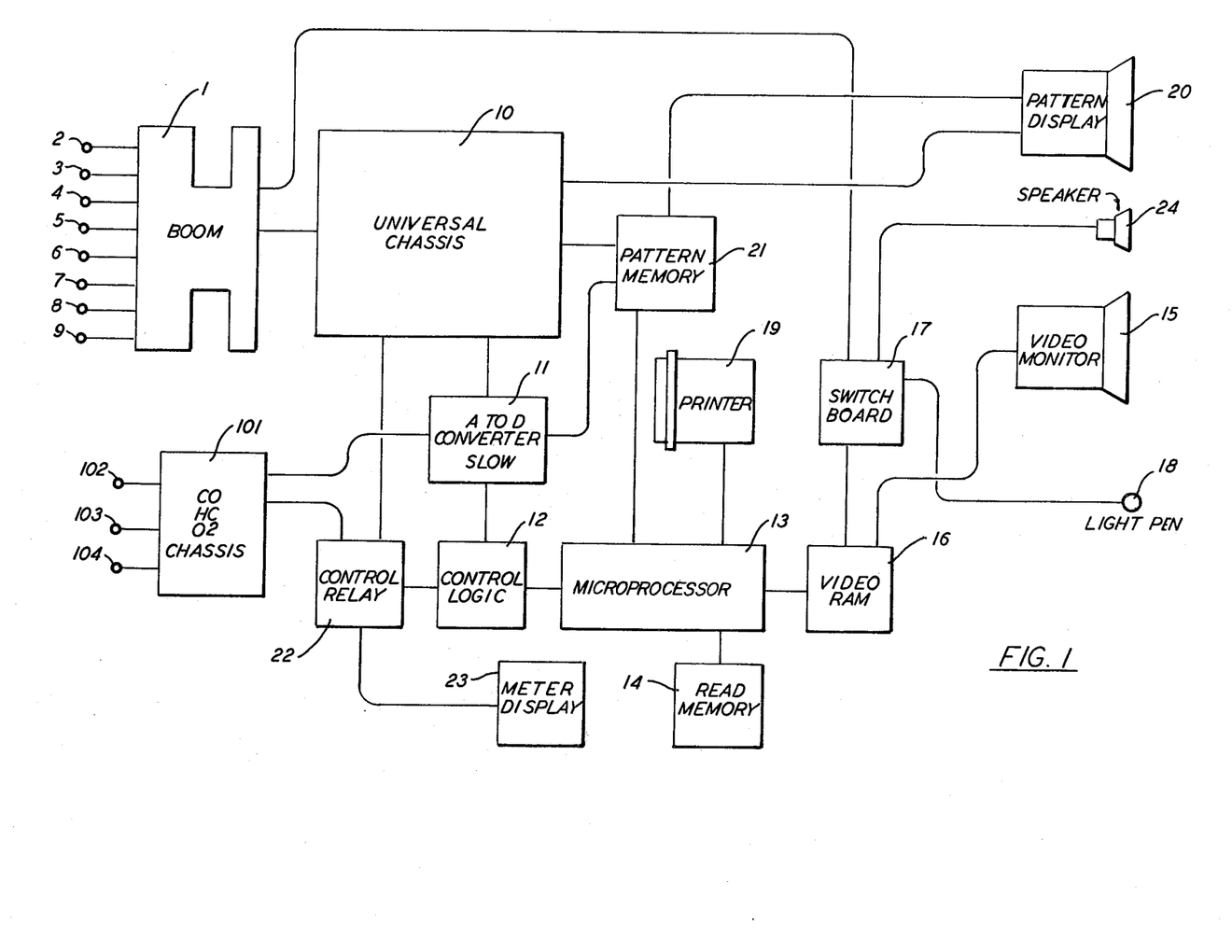
FIG. 1 is a block diagram identifying various physical components of an automated apparatus which includes the diagnostic apparatus according to the invention and with which the method according to the invention may be employed.

With reference to FIG. 1, a boom mounted test lead, shown at 1, allows connections to the engine: grounding clip 2; a battery connection 3; ignition point or coil negative connection 4; capacitive probe for clipping over the ignition wire to provide an input for secondary pattern waveforms 5; a probe for connection to the first firing cylinder 6; current probe for measuring D.C. current and alternator patterns 7; magnetic timing sensor, and/or timing light 8; and vacuum probe 9.

The boom, engine hook-up and the various lead and test probes may be conventional such as employed in the Allen Group Test Products Division, 16-000 and 25-000 Series Engine Analyzers previously referred to.

As shown in FIG. 1, signals received by the "boom" probes, (2-9) are input into universal chassis 10. Analog signals derived from the universal chassis are converted from the measured analog value into digital signals by means of conventional analog-to-digital conversion circuitry shown at 11 in FIG. 1, which in turn is controlled by control logic PCB, 12, which in turn determines which signals, at which occasions, are to be received for analysis by microprocessor 13.

In brief, analog-to-digital converter 11 provides a digital counterpart signal for further processing corresponding to the analog values registered by the sensor means of the boom test leads 2-9 and emissions probes 102, 103 and 104.

For complete engine diagnosis and analysis the apparatus also includes emissions probes 102, 103 and 104, leading from emissions chassis 101, to measure hydrocarbon, carbon monoxide and oxygen content of engine exhaust gases. These probes and chassis are likewise conventional with prior art engine emission analyzers such as the Allen Group Test Products Division, 23-000 Series, also manufactured by the above-identified Allen Group, Kalamazoo, Mich. 49007. Analog signals generated in such emissions probes are also first converted to digital signals in "slow" A-to-D converter 11. Because the emissions probe output is non-linear with respect to the correspondence between the analog probe signal and emissions concentrations measured, it is thereafter necessary that the probe signal after it is digitally converted, be, in turn, converted to an actual value signal for the emissions parameters measured when such signal is necessary for analysis or recordation. The correspondence between the non-linear probe signal and actual value is achieved by "look-up" table means provided by programming in microprocessor 13. The look-up table program converts the first non-linear digital probe signal into a "real value" digital parameter signal which is susceptible to further processing in the apparatus.

In connection with operation of microprocessor 13, there is related read memory 14, which, when addressed during pertinent tests, provides the appropriate AND matrix, look-up tables, and other data by which input engine parameters are processed and analyzed.

Microprocessor 13 also controls the operation of the apparatus through a programmed sequence included in memory 14. The microprocessor is also connected to video monitor 15 through video RAM 16, which provides alphabetic and numeric characters for display and is also an element of switching circuitry 17 operated by lightpen 18.

The preferred type of apparatus used with the invention also includes printer means 19, which provides a "hard copy" or multiple copies of information displayed on the screen of the video monitor. Waveform display CRT 20, and waveform pattern memory 21, are provided respectively for visual display of ignition system waveforms and the retention for analysis of the waveform signals. The overall apparatus also includes control/relay means, as depicted at 22, a conventional analog meter display, 23, for visual read-out of parameters such as volts, amps, etc. and also speaker 24 for providing audible indications of selection signals registered by the switching circuitry.

Figure 2:
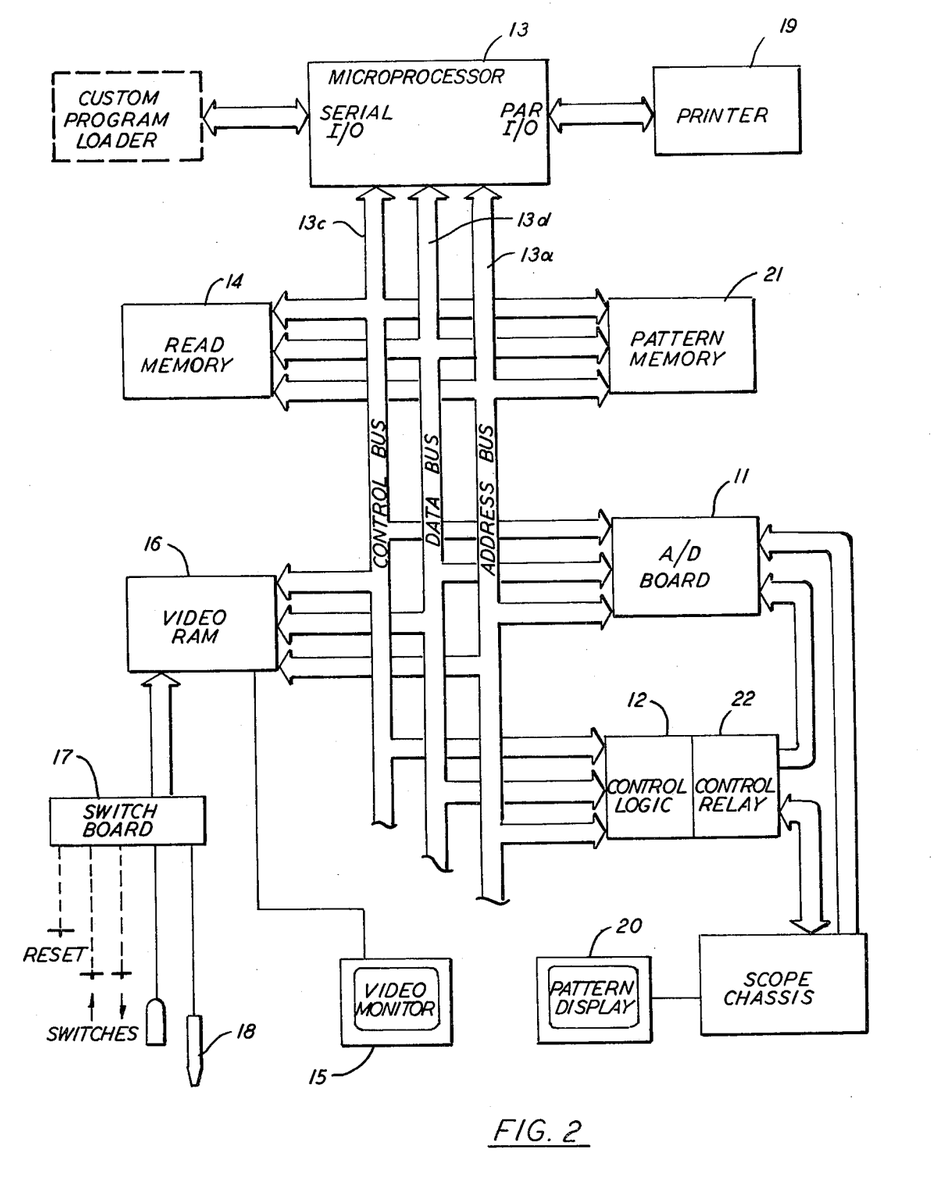
FIG. 2 is a block drawing showing the functional interrelationship of the principal operating components depicted in FIG. 1.

Operation of the overall apparatus is conducted in accord with the block diagram shown in FIG. 2 from which the various interrelationships of the respective component devices will be evident to one skilled in the art.

The apparatus includes conventional buses as are used in computers for two way communication between devices which in turn are connected to the bus through tri-state solid state switches in a manner that is known to persons skilled in the art. In accord with programming procedures which are known to those skilled in the appropriate art, appropriate coded signals provided by the microprocessor in accord with a predetermined time sequence determine which device is using any particular bus and to which device the bus is connected. There are three principal buses: (1) a 16 bit address bus 13$a$, which provides a binary address (number) that is decoded to select a device for operation under a predetermined circumstances; (2) the data bus 13$d$, which provides a binary word signal or informational data that is being transferred from one device to the other; and (3) the control bus 13$c$, which provides the signals from the microprocessor which determine whether a particular device should send or receive data upon transmission from the microprocessor of predetermined command signals. With respect to the apparatus herein, interdevice communication along the buses, the determination of the appropriate lines for the buses, and the manipulation of predetermined devices by coded signals involves programming methods and concepts which are known to those having skill in the appropriate art.

The microprocessor 13 is a single board computer. It contains a CPU, a clock for providing repeatable signals at predetermined time intervals pursuant to which programmed operations are undertaken, 4K of RAM (read, write memory), 8K of ROM (read only memory), and 48 lines of parallel input/output ("I/O") capacity. Through signals sent and received along the various buses, the microprocessor controls the operation of all other modules in the apparatus, and does all data processing and diagnosis. As shown in FIG. 2, the microprocessor may also be provided with an optional serial input/output port to be used for future expansion of capabilities.

Video monitor 15 contains the conventional video, sync and sweep portions of a television set with improved video frequency response and is used to display characters and to drive the light pen, 18. The light pen detects a light spot (bullseye) displayed on the monitor where there exists a need for the operator to provide an operator selectable input into the apparatus. Upon the correspondence of the pen with an appropriate bullseye displayed on the screen, an input is registered when the operator depresses a button on the light pen. A pulse is sent through the switch board to the video RAM. The timed interval between registry of the "button" signal and arrival of the pulse determines where the light pen was located on the screen and in turn determines which operator selectable input should be entered as qualifiers of the ultimate decisions to be made in accord with programmed operations. The video RAM, 16, is also a character display generator which stores characters sent from the microprocessor and encodes them into the video (and sync) signal for display by the monitor 15. Video RAM also latches the location of the beam when a pulse comes from the light pen. Upon command, the video RAM, 16, will send the microprocessor, 13, (1) the character at any location on the screen, (2) the light pen location and (3) switch-push information.

The control logic board 12 has decoding and processing circuitry, responsive to coded signals provided by the microprocessor, to control the relay board, 22, which shifts levels of activating voltages from the chassis to designated circuits in the apparatus during the sequency programmed operation and also switch patterns for display at CRT 20.

As related earlier, analog-to-digital board 11, includes means for converting analog data signals received from the engine boom and the emissions probe to digital values for the computer. Waveform pattern memory 21 stores engine waveform patterns in a bi-axial addressable matrix of time vs. amplitude for a selected waveform and the engine condition dwell for the waveform. The pattern memory also generates frozen patterns and provides stored digitized, addressable waveform amplitude values for analysis by the microprocessor. Read memory 14, is a 48K read-only-memory used in conjunction with the microprocessor for the storage of programs which may include the AND matrix diagnostic equations.

Figures 3, 3A:
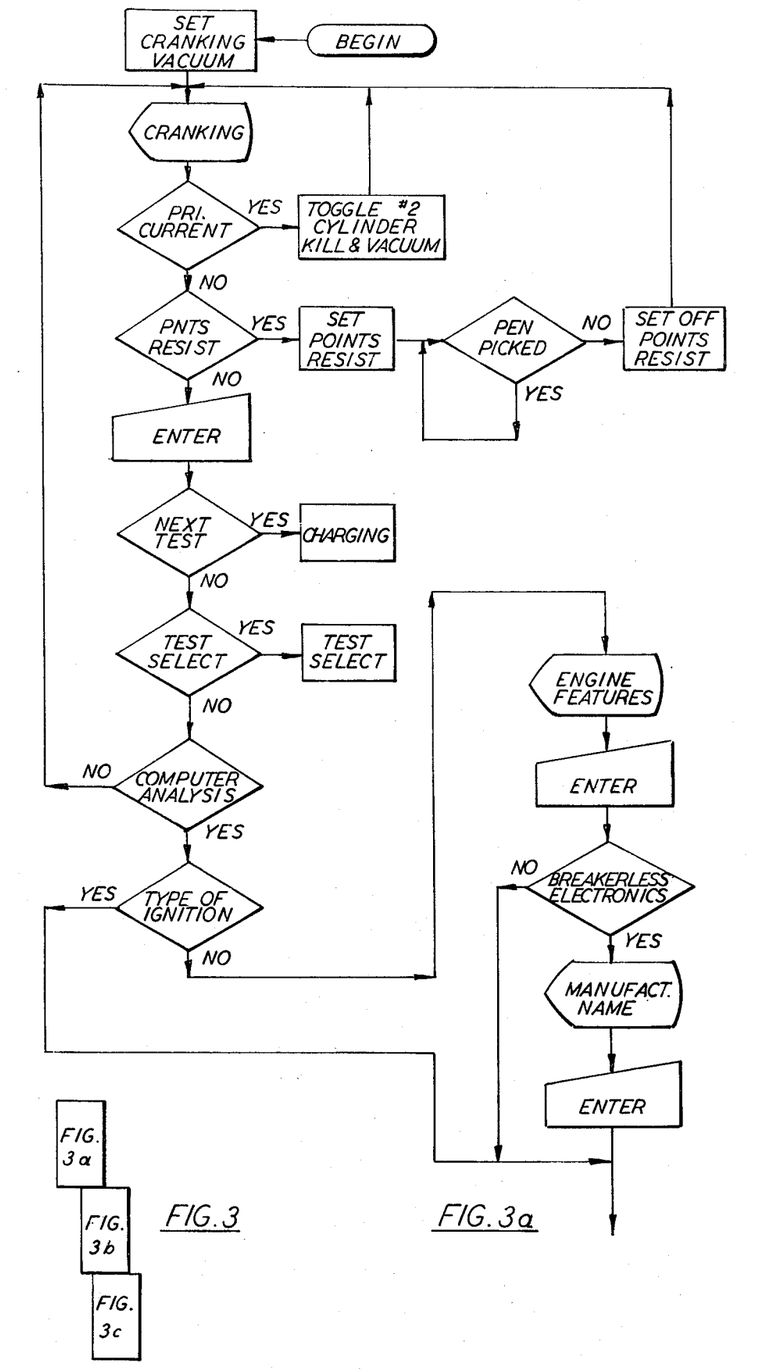
Figure 3B:
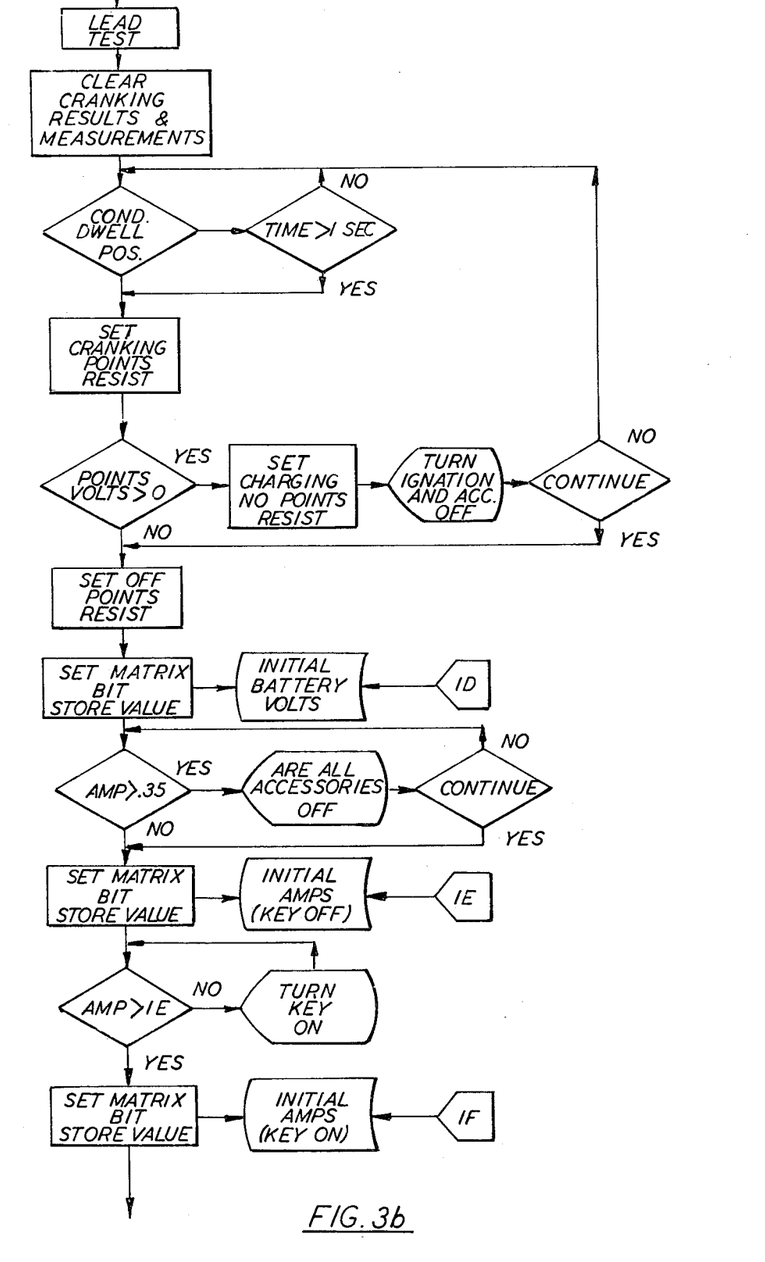
Figure 3C:
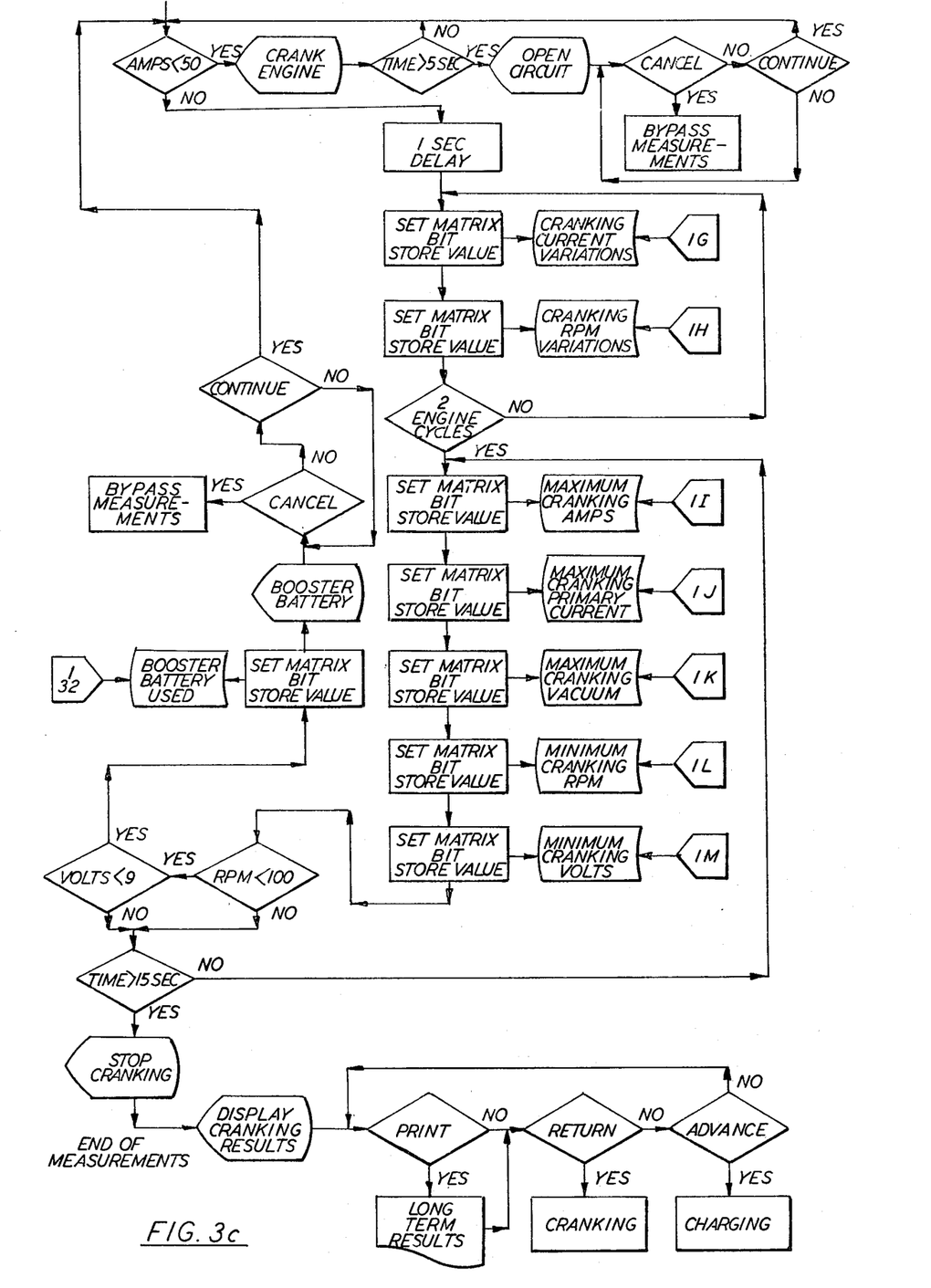

While in operation the apparatus performs a pre-programmed sequence of system tests under various engine operating conditions, which the operator is instructed to create by means of instruction displayed on the face of the video monitor CRT. A representative test sequence is shown in FIG. 3. The CRT displays programmed operator instructions, operator selectable input data such as ignition type [e.g. "ELECTRONIC IGNITION"] dwell, timing, number of cylinders, symptom input, [e.g. "HARD STARTING"], test selection information, and test results. The operator enters the appropriate information or selects the test to be performed by means of the lightpen. Measurements of the engine parameters are made, input into the apparatus and processed, and a diagnosis of the engine system is displayed on the CRT screen at the conclusion of a system test.

The character CRT sequentially displays programmed step by step instructions to the operator [e.g. "TURN IGNITION OFF", "CRANK ENGINE" . . . ] one at a time. The operator selects "CONTINUE" or "CANCEL" with the lightpen and the next succeeding step/instruction is displayed until the full complement of tests, under the instructed conditions which provide sufficient data for diagnosis, are conducted.

At the conclusion of the system test, conventional results, such as are indicated by the "STORE VALUE" commands in FIG. 3 are displayed (and optionally printed out) along with the appropriate diagnostic conclusions achieved by the matrix and diagnostic equation for each test [e.g. "UNDERCHARGED BATTERY"]. As shown in FIG. 3, however, the storage of the actual value of the measured parameters is independent of the "SET MATRIX BIT" signal which sets a location of the matrix with a "yes" "no" comparison result which may be required for diagnosis. The means of the invention to provide a diagnostic evaluation, independently of the stored test data is thus illustrated. The storage of the test data such as maxima or minima encountered during the system test is essentially irrelevant to, and unnecessary for, the diagnostic result which is achieved according to predetermined AND evaluations of predetermined matrix locations. Consequently, only the diagnosis realized and/or the "yes" or "no" data from which the diagnosis is made, need be stored.

With regard to the sequence of FIG. 3, if data is encountered which is not pertinent to any combination of "yes" signals required for satisfaction of a matrix equation, the measured value is stored for print out or display, and the testing sequence continues in an orderly manner to evaluate further parameters to determine whether or not any corresponds with respect to the binary alternative information required by reason of matrix positions in the diagnostic AND equation.

Preferably, a complete diagnosis of all engine systems is achieved when the following conventional system tests are performed in a predetermined sequence to obtain measurements of the engine parameters indicated.

(1) Cranking: battery voltage, cranking current, RPM, and primary current.
(2) High Speed Charging: battery voltage, charging current, RPM, high speed alternator pattern.
(3) High speed ignition: Primary pattern, dwell, timing variation, K.V. requirement.
(4) Low speed charging: Charging current, battery volts, idle alternator pattern.
(5) Low speed carburetion: CO, HC, Oxygen, RPM, Snap acceleration, Vacuum.
(6) Low speed ignition: KV variation, firing time, idle primary current, load KV, firing slope, turbulence.
(7) High speed carburetion: CO, HC, Oxygen, RPM, PCV contamination.
(8) Cylinder balance: RPM, Cylinder contribution.

The sequence of tests and the parameters measured during each test performed may correspond to that required by prior art instruction manuals.

EXAMPLE I

An operator selectable "specification" input designates a corresponding AND matrix equation and a matrix which "receives" pertinent data measured during the test and correlates measured data with a particular matrix location. In other words, "yes" "no" data (i.e. logical ones and zeros) resulting from comparisons of measured parameters with stored values is set in predetermined memory locations according to the selected matrix. Predetermined memory locations are then evaluated in accordance with the AND matrix equation to determine AND correlations. By reference to Table I, it can be seen that a diagnostic capability is instantly achieved based on measured results. Solution of the AND matrix equation in turn provides a diagnostic evaluation of the system and/or component involved based directly on the measured data. Thus, unlike prior methods of diagnosis of internal combustion engines, both manual and automated, the matrix of the apparatus does not require a separate conclusion whether a measured engine parameter is above, within, or below an engine specification "range" before information pertinent to that parameter is input into a matrix to achieve a diagnostic result. The matrix and AND equation of the present apparatus provide a diagnostic result directly from a predetermined comparison of an engine parameter reading with a stored value. Accordingly, greater efficiency in programmed operation is achieved since diagnostic information is input instantaneously into the matrix and diagnosis is accomplished simultaneously with the acquisition of data. As an example, a preferred matrix for the cranking test, conducted in accord with the results analysis shown in FIG. 3, is set forth below in Table I:

TABLE I

CRANKING TEST MATRIX

| DIAGNOSTIC ANALYSIS | AND MATRIX EQUATION |
|---|---|
| BATTERY DRAIN-KEY OFF | A |
| BATTERY DRAIN-KEY ON | B |
| STARTING CIRCUIT ACCEPTABLE | C |
| STARTING CIRCUIT OK | D |
| OR | |
| BATTERY OK | E |
| OR | |
| UNDERCHARGED BATTERY | F |
| LOW BATTERY CAPACITY | G |
| INSPECT CABLES | H |
| OR | |
| EXCESSIVE CURRENT | I |
| OR | |
| DEFECTIVE STARTER | J |
| OR | |
| OR | |
| OR | |
| DEFECTIVE STARTER DRIVE | K |

1 2 3 4 5 6 7 8 9 10 11 12 13 14 15 16 17 18 19 20 21 22 23 24

TABLE I-continued
CRANKING TEST MATRIX
DIAGNOSTIC ANALYSIS      AND MATRIX EQUATION Initially:

1. BATTERY VOLTS < 12
2. BATTERY VOLTS > 12
3. AMPS (KEY OFF) > 1.0
4. AMPS (KEY ON) > 12

After 5 Seconds:

5. CRANKING AMPS < 150
6. CRANKING AMPS < 200
7. CRANKING AMPS > 200
8. CRANKING AMPS < 250
9. CRANKING AMPS > 250
10. CRANKING RPM = 0
11. CRANKING RPM < 100
12. CRANKING RPM > 100
13. CRANKING RPM > 150

After 10 Seconds:

14. MIN CRANKING VOLTS < 9
15. MIN CRANKING VOLTS > 9
16. MIN CRANKING VOLTS < 9.6
17. MIN CRANKING VOLTS > 9.6
18. MIN CRANKING VOLTS > 10

Volts > 9 with booster

19. BOOSTER AMPS > 280
20. BOOSTER AMPS < 280

Operator selected engine specification:

21. 8 CYLINDERS OR MORE
22. 6 CYLINDERS OR LESS

Symptom input decision qualifiers:

23. HARD STARTING
24. NOT HARD STARTING

Once the appropriate matrix is determined by reason of the entry of operator selectable engine information which determines appropriate decision making criteria, the solution of the AND matrix equations consists only of AND logic functions and the information necessary for each matrix position consists simply of an alternative "0" or "1" ("no" or "yes") for each location in the matrix. The parameter readings are translated directly into a diagnostic result dependent upon an AND correlation of matrix locations. Thus, it can be seen that the diagnosis is results based in which the measured values of engine operating parameters are directly correlated in a matrix which can be viewed as a two dimensional array of interrelated rows and columns, and in which a correspondence can be provided solely in AND function relationships between (1) a set of "yes" signals based upon binary alternatives of measured data with respect to a predetermined stored data value associated with the matrix (row or column) position and (2) a predetermined diagnostic equation related to the coincidence of said "yes" signals (in a row or column) with respect to a particular state of engine operation. Upon the AND correspondence of the binary "yes" signals, information related to the state of the engine operation is provided.

The "OR" indications used in Table I are not alternative logic indications in the matrix equation, but rather indicate the plurality of AND indications which either (1) provide the same diagnostic result or (2) are dependent upon operator selectable decision qualifiers such as "Numbers of Cylinders" or "Symptom Input" to reach the same diagnostic result.

The simplicity with which an overall test of a complete engine system may be undertaken in accord with the AND function matrix is illustrated by the sequence of FIG. 3. After the operator selectable inputs are entered, the testing sequence appropriate to the matrix consists solely of alternative "yes" or "no" decisions which are set in as matrix bits in predetermined memory locations, based upon comparisons of measured values with stored absolute data values corresponding to the matrix positions to be set "SET MATRIX BIT" indicates the setting of a memory location, i.e. a matrix bit. TABLE I showing the "results" analysis of such SET MATRIX BIT signals, in connection with the testing sequence of FIG. 3, shows that the diagnosis method for an entire engine system is based solely on the "yes" or "no" information of a single alternative binary function. The need for any "or" subroutines and their consequent complexity and uncertainty of result is thereby avoided.

The "Diagnostic Analysis" indicated in Table I may be translated into a predetermined digitally coded signal to provide the appropriate alphabetic character readout corresponding to the indicated engine condition or instruction signal on the face of a CRT or on printer means. Such a representative coded signal may be in correlation with an appropriate data transmitting code or language for character generation.

EXAMPLE II

The certainty of the result and the simplicity of the method of the AND matrix method is illustrated when a comparison is made between the matrix of Table I and a corresponding Charging Test matrix used in connection with a prior art diagnostic instructional manual. The following matrix appears at page 10 in *Allen Test Programmed Training Course* 25-000 *Series Engine Analyzer* (PN 25620):

TABLE II

"The following chart provides a combination of test results obtained from [test procedures]. Based on the conditions of these tests, a likely problem is indicated.

| Cranking Volts | Cranking Speed | Starter Current | Recovery Voltage | Likely Problem |
|---|---|---|---|---|
| Low | Med/Slow | High | Good | Starter |
| Good | Slow | Good | Good | Battery Cables |
| Good/Low | Med | Good | Slow | Sulfated |
| Low | Med/Slow | Good | Low | Shorted Cell |
| Good | Slow | Low | Good | Battery Cables |
| Low | Good/Med | Good | Good | Underchg Battery |

It is evident from this prior art diagnostic matrix that the quality of information required for each matrix position is, first, an evaluative judgment of the engine parameter under test, a number of which must be made before a "Likely Problem" is indicated. With respect to a row or column in the matrix there are as many as five different subjective evaluations possible (e.g., the "Starter" problem row). Some matrix positions also involve alternative "OR" functions based upon evaluative judgments (e.g. "Cranking Volts" column includes "Good/Low").

While the Cranking Test shown in Example I is illustrative of the AND matrix method and means of data acquisition and analysis for one system test, similar results based AND matrix methods and means may be appropriately adapted for each other engine system test provided by the apparatus when appropriate system data incident to that system's operation is provided with respect to an appropriately based matrix.

What is claimed is:

1. In an apparatus for diagnosing at least one selected system of an internal combustion engine which includes means for receiving digital electrical measurement signals corresponding to measured values of a plurality of engine operating parameters associated with the engine system, means for storing digital electrical signals for the programmed diagnosis of the at least one selected system of the internal combustion engine and means for processing the digital electrical measurement signals in accordance with the programmed diagnosis, the improvement comprising;

the means for processing in cooperation with said means for storing making at least one yes/no comparison of a plurality of selected digital electrical measurement signals with respective predetermined values stored in the means for storing and providing the result of each such comparison as a digital result signal, selecting and evaluating digital result signals indicative of the yes/no comparison results in accordance with a predetermined AND diagnostic equation stored in the means for storing, and generating a signal related to the state of the at least one engine system being diagnosed based upon one or more AND correspondences only, of the digital result signals selected according to the predetermined diagnostic equation.

2. The apparatus according to claim 1 in which the means for storing has a plurality of addressable locations for storing digital data, and in which the means for processing in cooperation with the means for storing stores the digital result signals in predetermined locations in the means for storing, the means for processing being operative to address and evaluate the predetermined locations in accordance with the predetermined AND diagnostic equation.

3. The apparatus according to claim 2 in which the means for storing includes read/write memory having a plurality of addressable memory locations in which the digital result signals are stored.

4. The apparatus according to claim 1 in which the means for storing includes read only memory in which the AND diagnostic equation and the predetermined values are stored.

5. The apparatus according to claim 1 in which the means for processing and the means for storing are comprised by a microprocessor, the microprocessor including random access memory in which the digital result signals are stored, the means for storing further comprising read only memory in which the AND diagnostic equation and the predetermined values are stored.

6. The apparatus according to claim 1 and including means for entering information into the apparatus by the apparatus operator, said means for entering cooperating with the means for processing and the means for storing to select a predetermined AND diagnostic equation.

7. The apparatus according to claim 6 wherein said information is a symptom of the engine being diagnosed.

8. In a method for diagnosing at least one selected system of an internal combustion engine which includes the steps of receiving digital electrical measurement signals corresponding to measured values of a plurality of engine operating parameters associated with the engine system and processing the digital electrical measurement signals in accordance with a programmed diagnosis, the improvement comprising:

making at least one yes/no comparison of a plurality of selected digital electrical measurement signals with respective predetermined values, providing the result of each such comparison as a digital result signal, selecting and evaluating digital result signals indicative of the yes/no comparison results in accordance with a predetermined AND diagnostic equation, and generating a signal related to the state of the at least one engine system being diagnosed based upon one or more AND correspondences only, of the digital result signals selected according to the predetermined AND diagnostic equation.

* * * * *

UNITED STATES PATENT AND TRADEMARK OFFICE
CERTIFICATE OF CORRECTION

PATENT NO. : 4,373,186
DATED : February 8, 1983
INVENTOR(S) : Marshall et al.

It is certified that error appears in the above—identified patent and that said Letters Patent is hereby corrected as shown below:

Column 5, line 34, "generator" should read --operator--;

line 48, "where" should read --whose--.

Signed and Sealed this

Second Day of August 1983

[SEAL]

Attest:

GERALD J. MOSSINGHOFF

Attesting Officer

Commissioner of Patents and Trademarks